(12) United States Patent
DePaso

(10) Patent No.: US 7,228,954 B2
(45) Date of Patent: Jun. 12, 2007

(54) METHOD FOR CONVEYING TIRES

(75) Inventor: Joseph M. DePaso, Gretna, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/160,436

(22) Filed: Jun. 23, 2005

(65) Prior Publication Data

US 2006/0289272 A1 Dec. 28, 2006

(51) Int. Cl.
*B65G 47/00* (2006.01)
*B65G 47/10* (2006.01)
*B65G 47/30* (2006.01)
*B65G 47/46* (2006.01)

(52) U.S. Cl. ............... 198/448; 198/418.2; 198/370.01

(58) Field of Classification Search ............... 198/448, 198/418.2, 451, 443, 444, 576, 370.07, 370.01, 198/460.1, 347.4, 418.1, 418.5, 419.1, 431, 198/435
See application file for complete search history.

(56) References Cited

U.S. PATENT DOCUMENTS

| | | | |
|---|---|---|---|
| 1,425,556 A | 8/1922 | Tingwall et al. | |
| 1,531,711 A | 3/1925 | Marsh | |
| 3,895,716 A | 7/1975 | Ugo ............................ | 209/74 |
| 4,274,533 A * | 6/1981 | Abe ........................... | 198/450 |
| 4,527,937 A | 7/1985 | Tomasello | |
| 4,773,810 A * | 9/1988 | Nishimura et al. ..... | 414/331.11 |
| 4,778,060 A | 10/1988 | Wessner, Jr. ................. | 209/3.3 |
| 5,007,521 A * | 4/1991 | Tanaka ..................... | 198/347.4 |
| 6,148,990 A | 11/2000 | Lapeyre et al. ............. | 198/779 |
| 6,494,312 B2 | 12/2002 | Costanzo .................... | 198/779 |
| 6,499,980 B1 | 12/2002 | Fledderjohann et al. ... | 425/34.1 |
| 6,568,522 B1 | 5/2003 | Boelaars .................. | 198/347.2 |
| 6,582,212 B1 | 6/2003 | Mitamura | |
| 2004/0191050 A1* | 9/2004 | Lafontaine et al. ...... | 414/791.6 |
| 2004/0195073 A1* | 10/2004 | Prakken .................... | 198/418.1 |
| 2005/0103598 A1* | 5/2005 | Monti ........................ | 198/448 |

FOREIGN PATENT DOCUMENTS

JP 09194022 A 7/1997

OTHER PUBLICATIONS

European Patent Office as ISA, "Search Report of PCT/US2006-024733," Nov. 16, 2006, European Patent Office, Rijswijk, the Netherlands.

* cited by examiner

*Primary Examiner*—Gene O. Crawford
*Assistant Examiner*—Ramya G. Prakasam
(74) *Attorney, Agent, or Firm*—James T. Cronvich

(57) ABSTRACT

A conveyor system and associated method for conveying tires received from a multiplicity of tire presses. The conveyor system shown comprises a main, or trench, conveyor flanked on opposite sides by opposing groups of tire presses. Discharge conveyors deliver tires from the tire presses to the main conveyor at multiple positions along the length of the main conveyor. The tires are delivered from both sides of the main conveyor, which conveys them downstream. An open-loop sequencer activates each discharge conveyor to deliver tires to the main conveyor according to a schedule including the sequence of activating each of the discharge conveyors so as to avoid collisions between tires on the main conveyor.

6 Claims, 2 Drawing Sheets

| Activation Schedule |||| 
|---|---|---|---|
| Activation Order | Discharge Conveyor | Activation Time | Activation Delay |
| 1 | $A_1$ | 20 s | 0 s |
| 2 | $A_2$ | 20 s | 0 s |
| 3 | $A_3$ | 20 s | 0 s |
| 4 | $A_4$ | 20 s | 0 s |
| ------- | | | |
| n–3 | $A_{n-3}$ | 20 s | 0 s |
| n–2 | $A_{n-2}$ | 20 s | 0 s |
| n–1 | $A_{n-1}$ | 20 s | 0 s |
| n | $A_n$ | 20 s | 0 s |
| n+1 | $B_m$ | 30 s | 5 s |
| n+2 | $B_{m-1}$ | 30 s | 5 s |
| n+3 | $B_{m-2}$ | 30 s | 5 s |
| n+4 | $B_{m-3}$ | 30 s | 5 s |
| ------- | | | |
| n+m–3 | $B_4$ | 30 s | 5 s |
| n+m–2 | $B_3$ | 30 s | 5 s |
| n+m–1 | $B_2$ | 30 s | 5 s |
| n+m | $B_1$ | 30 s | 300 s |

FIG. 2

METHOD FOR CONVEYING TIRES

BACKGROUND

The invention relates to power-driven conveyor systems generally and, more particularly to apparatus and methods for conveying tires delivered from opposing rows of tire curing presses onto a central conveyor.

One of the last steps in the manufacture of a tire is molding and curing. In this step, the external rubber surfaces on a "green tire" are shaped under pressure and cured at elevated temperature in a tire press. A typical tire plant has many tire presses operating simultaneously to mold a variety of tires. The tires exiting the presses are discharged onto short discharge conveyors, such as gravity-roller conveyors, which deliver the tires onto a long main conveyor at various positions along its length. Because there may be many tire presses and many discharge conveyors feeding tires to the main conveyor along its length, collisions between tires delivered to the main conveyor from different tire presses are common. Sometimes the collisions can cause the flexible tires to jam within the confines of the main conveyor, which may result in deformation of the tires. Releasing a jam requires manual intervention, which is time-consuming and may be too late to avoid permanent deformation of the tires. Closed-loop controls that sense the positions of the tires and control the speed of the main conveyor or the discharge of tires onto the main conveyor are sometimes used to prevent jams. But closed-loop controls are complex with a multitude of sensors.

Thus, there is a need for a simple jam-free conveyor system for conveying tires received from a multiplicity of tire presses.

SUMMARY

This need and other needs are satisfied by a method, embodying features of the invention for delivering tires onto a main conveyor via a multiplicity of discharge conveyors from tire presses flanking the main conveyor on opposite sides. The method comprises determining a schedule that includes an activation sequence defining the order of activating the discharge conveyors to avoid collisions on the main conveyor and then activating the discharge conveyors according to the schedule to deliver tires from the tire presses over the discharge conveyors to the main conveyor.

BRIEF DESCRIPTION OF THE DRAWINGS

These advantages, aspects, and features of the invention are better understood by reference to the following description, appended claims, and accompanying drawings, in which:

FIG. 2 is a table representing an exemplary schedule for delivering tires from tire presses to a main conveyor in the conveyor system of FIG. 1.

DETAILED DESCRIPTION

Figure 1:
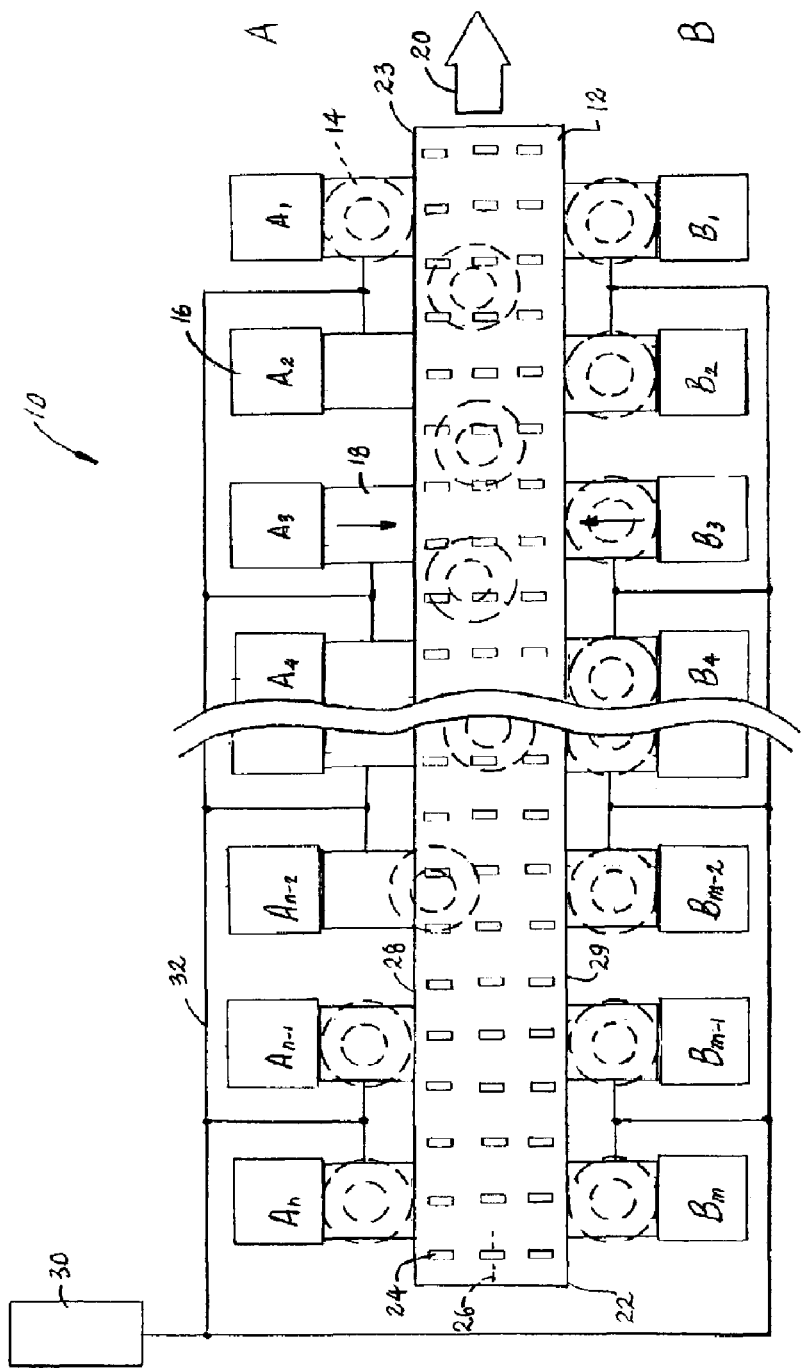
FIG. 1 is a top plan diagram of a tire conveyor system embodying features of the invention.

A conveyor system embodying features of the invention is shown in FIG. 1. The conveyor system 10 includes a main conveyor 12 fed tires 14 from a multiplicity of tire presses 16 via discharge conveyors 18. The main conveyor, often referred to as a trench conveyor because it is commonly installed below the level of the tire presses in a trench, advances in a conveyance direction 20 from an upstream end 22 to a downstream end 23. Tires delivered onto the main conveyor by the discharge conveyors are transported downstream to inspection or other processing stations.

The main conveyor can be realized in many ways. For example, it can be realized as a powered roller conveyor or a flat belt conveyor. Preferably, however, the conveyor is a sprocket-or drum-driven modular plastic belt conveyor with rollers 24 arranged to rotate on axes 26 parallel to the conveyance direction. The Series 400 Transverse Roller Top belt manufactured and sold by Intralox, L. L. C. of Harahan, La., USA is an example of a belt that can be used in a preferred main conveyor. The transverse rollers facilitate side-on transfer of tires onto the main conveyor from the discharge conveyors. The discharge conveyors may also be realized in different ways. For example, they may be gravity-roller conveyors arranged between the main conveyor and the elevated exits of the tire presses, or they may be flat belt or modular plastic belt conveyors leading from the tire presses to the main conveyor.

The main conveyor is shown in FIG. 1 flanked by two groups, A, B of tire presses and discharge conveyors disposed on opposite first and second sides 28, 29 of the main conveyor. Each group includes many tire presses and discharge conveyors transferring tires onto the main conveyor from both sides at infeed positions along the length of the main conveyor. In FIG. 1, for example, group A is shown with n tire presses, and group B has m tire presses, where m and n may be the same or different numbers. For simplicity, each tire press 16 is shown with an associated discharge conveyor 18. (Many tire presses cure and then discharge two tires at a time onto separate discharge conveyors.) Furthermore, each discharge conveyor is depicted as holding a single tire. In an actual installation, however, each discharge conveyor may hold a number of cooling tires.

To prevent tires delivered from one side of the main conveyor from colliding with tires delivered simultaneously from the other side, a sequencer 30 controls the delivery of tires onto the main conveyor by activation signals sent to the discharge conveyors over signal lines 32. A properly chosen activation sequence can eliminate jams that could be caused by collisions between tires delivered from opposite sides of the main conveyor and from tires being transferred onto the main conveyor at an already occupied position.

The discharge conveyors may be activated in a variety of ways depending on the kind of conveyors they are. For example, if the discharge conveyors are belt conveyors, they can be activated by turning on their associated drive motors. If the discharge conveyors are gravity rollers, they can be activated by moving a stop or other barrier blocking the advance of the tires to a non-blocking position allowing the tires to slide onto the main conveyor.

The sequencer, which may be realized as a programmable logic controller, a desktop computer or workstation, hard-wired relay logic, or a digital logic circuit, activates the discharge conveyors to deliver tires to the main conveyor according to a predetermined schedule designed to prevent collisions between tires on the main conveyor. The schedule defines an activation sequence that orders the activation of the discharge conveyors. For example, the activation schedule in the two leftmost columns of FIG. 2 defines a cascaded sequence of loading tires onto the main conveyor. The sequence begins with the downstream-most tire press $A_1$, in the first group or row A and continues in order upstream along the row to the last tire press $A_n$. Then the sequence continues with the second group or row B in an order from the tire press $B_m$ at the upstream end to the tire press $B_1$ at the downstream end, after which the sequence repeats. This cascaded sequence $(A_1, A_2 \ldots A_n, B_m, B_{m-1} \ldots B_1)$, in which no two discharge conveyors are simultaneously activated, prevents tire collisions on the main conveyor. Depending on the geometry of the layout, other activation sequences may work as well at avoiding collisions and improving throughput. For example, sequencing through odd positions first $(A_1, A_3, A_5 \ldots B_3, B_1)$ and then even positions $(A_2, A_4 \ldots B_4, B_2)$ or alternating from row to row, upstream then downstream $(A_1, B_2, A_3, B_4 \ldots A_4, B_3, A_2, B_1)$ or upstream only $(A_1, B_1, A_2, B_2 \ldots)$, may offer benefits in other layouts. Another scheme, which eliminates collisions at a cost in throughput, is to activate row A in an upstream cascade $(A_1, A_2, \ldots A_n)$ and then, after the final discharged tire from row A is conveyed past the downstream end of the main conveyor, to activate row B in an upstream cascade $(B_1, B_2, \ldots B_m)$. The delay between rows may be a fixed or predetermined period or may be determined by a tire sensor positioned at the downstream end of the main conveyor to detect the passing of the last discharged tire from each row. Some schedules may allow more than one discharge conveyor activated at the same time to improve throughput. Other schedules could allow the activation of some or all of the discharge conveyors more than once in each sequence. The programmability of the schedule gives the sequencer the flexibility to handle many conveyor configurations.

The activation schedule may optionally include other parameters, such as an activation time or an activation delay as shown in FIG. 2. The activation time defines the duration that the associated discharge conveyor is activated to deliver tires to the main conveyor. If some discharge conveyors are longer or slower than others or have more or less tire capacity, activation times tailored for the characteristics of each can be used to improve throughput by avoiding the dead time that could occur if all the discharge conveyors are activated for the same time, as in a simple version of the invention. In FIG. 2, all the discharge conveyors in row A are activated for 20 seconds, and all those in row B, for 30 seconds.

An activation delay may also optionally be part of the schedule. The activation delay defines the interval between the deactivation of the associated discharge conveyor and the activation of the next discharge conveyor in the sequence. This delay can be used to give tires delivered upstream time to pass before a downstream discharge conveyor is activated. For example, FIG. 2 shows activation delays of 0 for row A. That's because the sequence proceeds from downstream to upstream, and there are no tires on the main conveyor upstream of the next discharge conveyor in the sequence and no possibility of collisions. When the sequence gets to row B, however, it proceeds from upstream to downstream. Consequently, it may be beneficial to interpose a delay (e.g., 5 seconds) to allow the tires to pass before the downstream discharge conveyor next in the sequence is activated. The activation delay for the last discharge conveyor in the sequence, $B_1$ in the schedule of FIG. 2, represents a delay (e.g., 300 seconds) before the sequence is repeated at a predetermined rate. This delay could be chosen to depend on the shortest cycle time of all the tire curing presses. Even though the sequencer operates as an open-loop control without feedback from multiple sensors, the schedule allows it to be programmed to maximize throughput while avoiding collisions and eliminating jams. And, if used in conjunction with just a few sensors, such as a sensor signaling the completion of the cycle of the tire press having the shortest cycle time or a sensor sensing a selected epoch in the activation sequence, the schedule can be tuned more tightly for more efficient, collision-free throughput.

Although the invention has been described with reference to a preferred version, other versions are possible. For example, the activation times and activation delays listed in FIG. 2 are relative times; i.e., the activation time durations are relative to the start of the activation period, and the activation delays are relative to the end of the preceding activation period. They could either or both be relative to other events, such as the start of the next sequence, or absolute, based on time of day. As another example, each tire press is shown associated with a single discharge conveyor, but more than one tire press could feed each discharge conveyor. As yet another example, the activation signals could be electrical over copper wires, electromagnetic through the air, or pneumatic over air lines depending on the kind of discharge conveyor used and how it is operated to start and stop the delivery of tires. So, as these few examples suggest, the scope of the claims is not meant to be limited to the preferred version described in detail.

What is claimed is:

1. A method for delivering tires onto a main conveyor that extends in a conveyance direction from an upstream end to a downstream end via a multiplicity of discharge conveyors from tire presses flanking the main conveyor on opposite sides, the method comprising:
   determining a schedule including an activation sequence defining the order of activating the discharge conveyors flanking the main conveyor on opposite sides to deliver tires to the main conveyor so as to avoid tire collisions on the main conveyor;
   activating the discharge conveyors according to the schedule to deliver tires from the tire presses over the discharge conveyors to the main conveyor.

2. The method of claim 1 comprising:
   activating each discharge conveyor for the same duration.

3. The method of claim 1 further comprising:
   including in the schedule an activation time associated with each discharge conveyor in the activation sequence to define a duration of activation for each discharge conveyor.

4. The method of claim 1 further comprising:
   including in the schedule an activation delay associated with each discharge conveyor in the activation sequence to define a delay before activation of the next discharge conveyor to be activated according to the activation sequence.

5. The method of claim 1 further comprising:
   repeating the activation sequence at a predetermined rate.

6. The method of claim 1 wherein the tire presses and the associated discharge conveyors flank the main conveyor in two groups along opposite sides of the main conveyor and wherein the schedule includes an activation sequence that proceeds sequentially upstream through one group of the discharge conveyors on one side of the main conveyor and then sequentially downstream through the other group discharge conveyors on the other side of the main conveyor.

* * * * *